United States Patent Office 3,399,725
Patented Sept. 3, 1968

3,399,725
WATER FLOODING PROCESS FOR THE RECOVERY OF PETROLEUM AND IMPROVED WATER FLOODING PROCESS
David J. Pye, Alamo, Calif., assignor to The Dow Chemical Company, Midland, Mich., a corporation of Delaware
No Drawing. Continuation-in-part of application Ser. No. 329,256, Dec. 9, 1963. This application July 29, 1966, Ser. No. 568,766
4 Claims. (Cl. 166—9)

ABSTRACT OF THE DISCLOSURE

An improved water flooding process is disclosed in which water-soluble, substantially linear organic polymers characterized by a resistance property of at least 1.5 are dissolved in the aqueous flooding medium in an amount from 0.001 to about 0.2 percent by weight. The aqueous flooding medium is substantially free of molecular oxygen. The improved process produces surprising benefits when applied to the secondary recovery of oil having a viscosity within the range from 0.1 to 6 centipoises, especially in formations with high variability in permeability distribution and opportunity for cross flow.

---

This application is a continuation-in-part of my co-pending applications Ser. No. 329,256, filed Dec. 9, 1963, now U.S. Patent Number 3,282,337, and Ser. No. 488,278, filed Sept. 17, 1965, now U.S. Patent Number 3,343,601.

During primary recovery operations, the energy required to force oil into producing wells is usually supplied by natural gas pressure, which may exist as a gas cap within the formation or evolve from gas dissolved in the oil. At the end of primary production operations it has been observed that the amount of oil recovered is generally only a small fraction of the available oil. As a consequence, it has become common practice in the art to utilize secondary oil recovery techniques.

One mode of operation for the secondary recovery of oil involves injecting an aqueous flooding medium, hence the term water-flooding, into the oil bearing formation through an input well penetrating the formation. This provides the energy and flushing action necessary to force oil remaining within the formation into nearby output wells penetrating the same formation. The efficiency of such a recovery process will vary with the heterogeneity of the formation, i.e., variability in the permeability of the formation, and the viscosity of the oil to be displaced.

It has generally been considered uneconomical to employ water-flooding techniques to recover high viscosity oils. The wide difference between the viscosity of the residual oil and the viscosity of the water or brine flooding medium results in a poor recovery efficiency. When this difference is great enough, an aqueous flooding medium will tend to "finger" through the high viscosity oil front and thereby bypass most of the available oil. The problem of obtaining efficient oil recovery is further aggravated by the fact that there are virtually no oil bearing formations of uniform permeability. Rather, the typical oil bearing formation consists of multiple layers of rock having different and often widely varying permeabilities to liquid flow. In such instances it is apparent that a flooding medium will tend to selectively follow the course of least resistance, e.g., a zone of high permeability, and thus quickly penetrate and bypass the oil. Under these adverse conditions, the output wells are soon producing so much of the flooding medium in relation to oil that the secondary recovery process can no longer be operated economically.

It has been taught that better recovery of the residual oil can be achieved in water-flooding operations by incorporating into the aqueous flooding medium various materials such as water-soluble polymers whereby the viscosity of the flooding medium is increased. The enhanced viscosity has the effect of decreasing the mobility ratio of the flooding medium in relation to the residual oil. Mobility ratio is defined herein according to the formula:

$$M_r = \left(\frac{K_w}{\mu_w}\right) \times \left(\frac{\mu_o}{K_o}\right)$$

wherein $\mu_w$ and $\mu_o$ are the viscosities in centipoises of the flooding polymer solution and oil to be displaced from the formation respectively. $K_w$ and $K_o$ are the relative permeabilities of the oil bearing formation to the flooding medium and oil, respectively.

Illustrative of teachings with regard to the use of viscous aqueous flooding mediums are the patents: Detling, U.S. Pat. 2,341,500; Binder et al., U.S. Pat. 2,731,414; Sandiford et al., U.S. Pat. 2,827,964; Engelhardt, U.S. Pat. 2,842,492; Zerweck et al., U.S. Pat. 3,020,953; Roper, U.S. Pat. 3,025,237; and McKennon, U.S. Pat. 3,039,529. It is generally taught in these references that for best results the amount of the viscosity enhancing material employed should be sufficient to increase the viscosity of the water-flooding medium to a point at which its viscosity is at least a substantial percentage of the viscosity of the oil to be displaced, and preferably, equal to or slightly greater than such viscosity. At such relative viscosities the resistance to flow of the water-flooding medium through the oil bearing formation will be about the same as that for the oil to be displaced. Thus the relative flow rates of oil and the flooding medium in the formations will be comparable and the tendency of the flooding medium to penetrate and finger through the displaced oil front will be substantially diminished.

Some of the foregoing inventors such as Detling, Binder et al. and Sandiford et al., who have taught that it is preferred to use flooding mediums having a viscosity on the order of, or greater than, the oil to be displaced, recognized the prohibitive costs of maintaining a continuous flood of such nature. In order to overcome the need for the large amount of a thickening agent required to maintain a high viscosity flooding medium, the discontinuous or "slug" flooding technique was developed. This technique involves initially flooding the oil bearing formation with a viscous medium and following that after a suitable interval of time with a relatively less viscous medium which may be simply water or brine. While the "slug" technique is an improvement giving more economical operation than the continuous viscous water flood, the less viscous second flooding medium still tends to finger through the initial viscous flood front, particularly as it thins out at the periphery of the expanding flood front, and the oil preceding it to give an early high water cut at the producing wells. Consequently, the efficacy of the intermittent "slug" flooding technique leaves substantial room for improvement.

By way of contrast to the above discussed problems generally associated with the production of viscous oil by waterflooding, the production of non-viscous oils of less than about 6 centipoises is generally anticipated to be efficient providing the reservoir is not abnormally heterogeneous with respect to premeability distribution. In other words, if the reservoir is relatively homogeneous and the low viscosity of the oil results in a mobility ratio of about unity with water as the flooding medium, the use of polymers to increase the viscosity of the flooding medium is generally considered economically unfeasible.

However, many reservoirs found in practice are characterized by a wide premeability distribution or severe heterogeneity so that recoveries are poor even if the low oil viscosity provides a unity mobility ratio. For example, if a simplified reesrvoir consists of two parallel stratified sand bodies having a premeability ratio of 10 fold, the higher permeability zone will have produced all of its oil and be flowing only water when the lower permeability zone will still contain 90% of its oil. At this point, the combined pair of zones will be producing at a 90% water cut and still contain 45% of its oil unproduced. The seriousness of the permeability problem will be evident when it is realized that 50 fold ranges in permeability are not uncommon.

If the flooding medium to oil mobility ratio is unfavorable, or greater than 1, the inefficiencies are magnified almost in proportion to the mobility ratio. However if the mobility ratio is favorable, or less than 1, the adverse permeability effect is reduced.

The present invention, which is directed to a novel and highly efficacious process for the secondary recovery of oil, is based in part upon the surprising discovery that certain water-soluble polymers confer on their dilute solutions a very high reluctance to flow in compact oil bearing media. The preferred media for treatment by the process of the invention include compact sandstone and oolitic limestone oil bearing formations. The word "compact" as employed above means the formation is composed of essentially continuous microporous rock and does not contain extensive communicating cracks or fissures. These would constitute flow channels in which fluid injected into the formation would bypass the greater portion of the oil bearing formation.

In particular, the invention comprises injecting into an input well penetrating the subterranean, compact, oil bearing formation, also penetrated by output wells, an aqueous flooding medium being substantially free of molecular oxygen and having dissolved therein, a limited amount as hereinafter defined, of a water-soluble polymer characterized by a "resistance property" of at least 1.5 "Substantially free of molecular oxygen" as used above, means the aqueous flooding medium contains less than 1 part, preferably less than 0.1 part, by weight, of free oxygen per million parts by weight of the aqueous system. Free oxygen refers to oxygen which is not chemically bonded to another element.

Practice of the foregoing process will produce excellent recovery of oil with the employment of a minimal amount of a flooding medium additive.

The novel "resistance property" of water-soluble polymers employed herein is defined according to the following formula:

$$\text{Resistance property} = R = \frac{27}{(Q_p \eta_p)} - 1$$

In the formula $\eta_p$ is the viscosity of a 0.05% by weight solution of the water-soluble polymer in a 3% by weight aqueous sodium chloride solution, such viscosity being measured with an Ostwald viscosimeter, i.e., determined by means of measuring flow rates through a capillary at 25° C. $Q_p$ is the flow rate in milliliters per minute, under a given pressure, of a 0.05% by weight solution of the polymer in a 3% by weight aqueous sodium chloride solution, lengthwise through a right cylindrical core of Berea sandstone, one inch in diameter and one inch long, the core having been previously saturated with the 3% sodium chloride solution. The sandstone core used in this measurement has, when dry, a permeability to air within the range of 100 to 500 millidarcys. The pressure at which the flow rate is measured is that pressure required to flow a solution of 3% by weight sodium chloride in water through the sandstone core at a rate of 30 milliliters per minute.

The variability of the above measuring procedure with respect to the permeability of the sandstone core is necessitated by the practical impossibility of obtaining a sandstone or other microporous media of a given permeability. The variability allowed in this respect does not, however, significantly alter the measured value of the "resistance property" of the polymer.

While the mechanism or technology of the "resistance property" in water flooding operations is not thoroughly understood, its utilization with respect to viscous oils clearly is a novel departure from the generally accepted principle for secondary water flooding operations that the viscosity of the flooding medium should be at least a substantial percentage of, or equal to, the viscosity of the oil to be displaced in the formation. By contrast, in the practice of the invention highly efficient displacement of viscous oil from an oil bearing formation is accomplished with flooding media having viscosities from 0.5% to about 15% of the residual oil to be displaced.

When applied to low viscosity oils, the recovery process of the invention can readily be operated to achieve low apparent mobility ratios and thus realize unexpected increases in recovery even though, by comparison the mobility ratio with an unmodified water flood is favorable, i.e., less than 0.9. Such "apparent mobility ratios" are equal to $M_r/R$, as these terms have been herein defined.

Illustratively, assume that the mobility ratio of an ordinary viscous flooding medium is slightly unfavorable, e.g., a $M_r$ of 2 which is based on an ordinary viscous medium having a viscosity of 1.4 centipoises flooding a 6 centipoise oil. Then for the purpose of comparison assume that the flooding medium is a 1.4 centipoise solution of a polymer having a resistance property of 10 in accordance with the invention. The "apparent mobility ratio" becomes 2/10 or 0.2, a highly significant improvement. This improvement by a factor of 10 in the mobility ratio can be utilized to effect either an unusual improvement in oil recovery or, if a lesser improvement is adequate, economic earnings can be realized by reducing, still further, the polymer concentration.

In the practice of the present invention in reservoirs containing low viscosity oils in the range of 0.1 to 6 centipoises where the normal waterflood mobility ratios are approximately 1 or even less, it is realized that areal sweep and displacement inefficiencies are not great but inefficiencies resulting from permeability distribution or reservoir heterogeneity can be serious, depending on the range and type of heterogeneity. In either case, significant increases in recovery can be made by using low concentrations of the polymers in accordance with the present invention to make the mobility conditions more favorable. For example, by a factor of 10.

Reservoir heterogeneity is observed in two forms. In one case, a series of more or less parallel sand bodies of different permeability are separated by shale layers or other permeability barriers so that no vertical communication between layers exists. In the second case, the various sand layers are laid down in direct contact so that cross flow between layers of different permeability can take place.

In the first case of a stratified reservoir, significant recovery improvements can be made by providing a significantly favorable mobility ratio of say 10. But in no event can the mobility ratio be made favorable enough to make layers of appreciably different permeabilities flood simultaneously.

However, in the second case where cross flow can take place, favorable mobility ratios create a condition wherein vertical pressure differentials are generated so that oil in the low permeability zones flows vertically to the high permeability zones through which it is carried to the producing well. With the high "apparent mobility ratios" attainable in the practice of the invention it is possible to achieve a flood front in which the oil-water interfaces of the superimposed zones can lie above one another. In effect the displacement is piston-like in spite of the permeability differences.

As mentioned above, the unexpected performances of aqueous solutions of polymers having resistance properties of at least 1.5 in oil bearing rock formations is limited to dilute solutions of these polymers. That is polymer solutions containing at least about 0.001% but no more than about 0.2% by weight polymer solids are used. As the polymer solids are increased above this upper concentration limit, they begin to act more like, i.e., correspond in efficiency, to ordinary viscosity enhancing agents. The lower limit is the concentration level at which the first significant improvement in sweep recovery efficiency is realized.

The stipulated condition that the aqueous flooding medium be substantially free of molecular oxygen is achieved by any one, or combination of ways. A direct and convenient technique is to utilize well water for making up the flooding medium. By "well water" is meant any water produced from a subterranean formation. While in the earth, water is normally under reducing conditions and thus, if when brought to the surface, it is maintained in a closed system whereby oxygen is excluded, the oxygen level will be maintained at a satisfactory low level. If surface water is to be employed as the flooding medium base, special treatments must be utilized to reduce the oxygen normally dissolved in such water. One such technique involves scrubbing the water with an inert gas, preferably at an elevated temperature whereby any oxygen present is substantially eluted. A sometimes more convenient technique incorporating an oxygen reducing agent into the surface water. Illustratively the surface water can be deoxygenated by treating it with any of a variety of chemical reducing agents such as alkali metal hydrosulfites, hydrazine, alkali metal and alkaline earth metal hydrides, and a variety of oxygen reactive organic agents such as pyrogallol and the like reagents. A particularly efficient system includes the conjoint use of a water-soluble hydrosulfite salt with cobaltous ions. By whatever technique the flood water base is deoxygenated it is essential as hereinbefore described to maintain the oxygen content below about 1 part per million. By maintaining the oxygen content at satisfactory low levels the "resistance property" of the polymer is effectively stabilized under the conditions of its use in flooding oil bearing formations as described above.

Polymers that can be employed in the invention are water-soluble organic polymers, sometimes referred to as hydrophilic polymeric colloids, characterized by substantial linearity, high molecular weight and by the heretofore undefined "resistance property" as previously defined. The term "water-soluble," as employed in the foregoing terminology, means dispersible in water to provide a visually homogeneous system infinitely dilutable with water.

Water solubility is imparted to such polymers by incorporating in and along the polymer chain a number of hydrophilic moieties sufficient to more than offset the otherwise hydrophobic character of the organic polymer. One class of such hydrophilic moieties includes the ionizable groups. Among these are the sulfate and sulfonate acid and salt groups, carboxylate salt groups, amino and ammonium groups, the latter being inclusive of protonated as well as quaternary derivatives of the amines, e.g., mono-, di- and trialkyl substituted ammonium salt groups, and phosphonic acid and mono- and dibasic salts thereof. Whenever acid salts are referred to, those generally intended are the alkali metal, alkaline earth metal (water-soluble species thereof) and ammonium salts. The total carbons in the nitrogen substituents of the amines generally should not exceed about 12 carbons. Another class of hydrophilic moieties are such non-ionizable groups as carboxamide, and mono- and dialkyl nitrogen substituted carboxamides, having a total of up to about 8 carbons, and hydroxyl groups. Also of a non-ionizable hydrophilic nature, though less strongly than some of the aforementioned groups are acetal, ketal, carbamate and lactam groups. In any event, the polymers employed herein contain one or more of the aforedescribed hydrophilic moieties and the like in and along the polymer chain in a sufficient amount to render the resulting polymer water soluble as defined above.

The term linear, as employed to characterize polymers used in the invention, means substantially free of crosslinking groups between polymer chains. This definition includes the various forms of homogeneous and block copolymers, with or without branching, as well as homopolymers.

"High molecular weight," as employed to characterize the polymers, means macromolecular in size. It is common practice, however, to characterize such polymers as being "resinous." While a given minimum molecular weight would be arbitrary especially when used to define across the board the transition point between low polymers and macromolecules, polymers are to be generally considered as having "high molecular weights" for purposes herein at weight average molecular weights above about 100,000. In the instance of vinyl addition polymers, the preferred polymers have weight average molecular weights in excess of 0.5 million.

Polymers of the foregoing specified characteristics are obtained as naturally occurring polymers or by various modifications of the naturally occurring polymers as well as by synthesis by means of addition or condensation polymerizations of appropriate monomers. Technology for preparing water-soluble polymers useful herein is known. The chemistry of many polymers useful herein will be found among the addition polymers obtained by ethylenic polymerization such as those described in Hedrick et al., U.S. Pat. 2,625,529, Aimone et al., U.S. Pat. 2,740,522 and Booth et al., U.S. Pat. 2,729,557. A variety of polysaccharide derivatives are described in Gloor, U.S. Pat. 2,728,725. Polyurethanes or chain extended polyols will be found in Hones et al., U.S. Pat. 3,054,778 and a variety of polycarbamates and lactams in Hibbard et al., U.S. Pat. 3,044,992, Walles et al., U.S. Pat. 2,946,772, Vitales, U.S. Pat. 2,874,124 and Fong et al., U.S. Pat. 3,000,830. These are to mention but a few of the well-known chemical avenues for the preparation of water-soluble macromolecules which may be characterized by the "resistance properties" essential to the invention. Further general descriptions of a variety of water-soluble macromolecules is contained in Davidson and Sittig "Water Soluble Resins," Reinhold Publishing Corp., New York, 1962.

Superior polymers having resistance properties in excess of 3 include high molecular weight, i.e., resinous, water-soluble polymers, described otherwise as above, and further characterized by having a plurality of hydrophilic sulfonate or alcoholate groups along the polymer chain wherein the cation is hydrogen or an alkali metal.

Specific polymers among the preferred class are the polyvinyl aromatic sulfonates characterized by ultra-high molecular weights an solubility in water. Such polymers correspond to homopolymers and copolymers containing in chemically combined form at least about 85% of a vinyl aromatic slfonate having the formula:

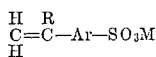

wherein Ar is a divalent monocyclic hydrocarbon radical of the benzene series having its valences on nuclear, i.e., ring carbons, R is selected from the group consisting of hydrogen and methyl and M is hydrogen or any water-soluble, salt forming, monovalent cation. For instance, suitable salt forms of the vinyl aromatic sulfonate include the alkali metal, ammonium, water-soluble amine, and the like salts.

The preferred polyvinyl aromatic sulfonates are further characterized by a reduced viscosity number of at least about 17. Though an upper limit is not known, polymers having reduced viscosity numbers up to as much as 52 are effective in the invention, i.e., they have the described "resistance properties" in dilute aqueous solution. Reduced viscosity $\eta_r$ is defined according to the formula:

$$\eta_r = \frac{\left(\frac{T}{T_0} - 1\right)}{C}$$

wherein C is the concentration of the polymer sulfonate in grams per hundred milliliters of an aqueous 0.5 normal sodium chloride solution. For the purposes herein, C is to be taken as 0.4. T is the flow time of the 0.5 normal sodium chloride solution having dissolved therein 0.4 gram per 100 milliliters of the solution of the polyvinyl aromatic sulfonate and $T_0$ is the flow time of the aqueous 0.5 normal sodium chloride solution. The flow times of the solutions are obtained under comparable conditions with an Ostwald viscosimeter at 30° C.

The described polymers can be prepared by the direct polymerization of vinyl aromatic sulfonate monomers or by the sulfonation of a polyvinyl aromatic backbone polymer. An effective technique for accomplishing this latter reaction is that described by A. F. Turbak in U.S. Pat. 3,072,618. Normally, sulfonation to a degree of at least about 85% of the reoccurring moieties is sufficient for the purpose of providing a water-soluble polymer. Backbone polymers suitable for sulfonating include toluene-soluble, high molecular weight, thermo-plastic polyvinyltoluenes, polystyrenes, poly-a-methylstyrenes and the like polyvinyl aromatic backbone polymers. These backbone polymers must be of a sufficient molecular weight that when they are sulfonated, the resulting polymer has a reduced viscosity number of at least 17.

Another class of polymers which produce superior "resistance properties" in dilute aqueous solution are the flocculant grade water-soluble polyethylene oxides. Illustrative of such polymers are those described by Colwell et al., in U.S. Pat. 3,020,231. The polyethylene oxide polymers intended are those having a reduced viscosity in acetonitrile of at least 1.0 and upwards to 75 and higher.

In a typical water-flooding operation, a 40 centipoise oil is to be displaced from a compact, micro-porous, consolidated sandstone formation. A preferred mode of operation to accomplish this objective in accordance with this invention involves dissolving a water-soluble polyvinyl aromatic sulfonate characterized by a "resistance property" of at least 1.5 in connate water from the formation to be flooded. This water is obtained from producing wells in a nearby field and maintained in a closed system whereby the atmosphere, i.e., oxygen is excluded. Enough of the polymer is dissolved in the flood water to provide a solution having a viscostiy of about 2 centipoise, i.e., 5% of the viscosity of the residual oil. With the ultra high molecular weight polyvinyl aromatic sulfonated, described above, the desired viscosity is achieved with the employment of as little as about 0.05% by weight of the polymer but up to as much as about 0.2% by weight of the polymer can be used if desired.

Having prepared an aqueous flooding medium as described, it may in some instances be conducive to better results if prior to injecting it into the oil bearing formation, the flooding solution is filtered to remove any suspended solids. Such solids may plug the face of the oil bearing formation thereby slowing or possibly preventing injection of the flooding medium.

Techniques for conducting the water-flooding operation are well known in the art. Before the flooding medium is introduced into the compact oil bearing formation, the nature of the reservoir to be flooded is studied. Considerations which must be taken into account are the shape of the formation, inclination of the various strata in the formation, viscosity of the oil, the heterogeneity of the formation, and existing wells capable of assignment to input well and output well functions.

Having determined a flooding pattern, injection of the flooding medium is accomplished through input wells penetrating the oil bearing formation with high pressure pumping equipment. Although not essential for satisfactory results, it is preferred practice to avoid subjecting the polymer solution to shearing action while handling it prior to and during injection. It is especially important to avoid the use of devices such as in-line pressure regulators and high shear inducing pumps, which subject the polymer solution to substantial shear and thereby mechanically decrease the "resistance property" of the polymer. Illustratively, reductions in pressure from high pressure supply lines to feed lines for individual wells are best achieved by inserting filter plugs of sufficient length in the feed lines to produce the desired pressure drop.

Upon introduction of the flooding solution into the oil bearing formation, a general displacement of the oil away from the input well results. The oil is thus forced into adjacent output wells. This flooding operation is usually carried out until the output wells are producing such a large proportion of water relative to oil that the process is no longer economical. Practice of the invention results in the advantages that the period of time during which oil is economically produced and the total quantity of oil produced are substantially increased. These advantages are, at least in part, due to the minimization of the fingering problem and achievement of increased sweep recovery.

The following examples illustrate the invention but should not be considered as limitations thereon.

Examples 1–7

The following operations were carried out to demonstrate the advantages of employing polymers having "resistance properties" in accordance with the invention to effect displacement of residual oil from an oil bearing formation. For the purposes of comparison, several similar operations were made employing water-soluble polymers that were not characterized by "resistance properties" as described herein. Comparisons were also made with a typical brine flood.

To simulate conditions encountered by a viscosity enhanced flooding medium in a compact microporous oil bearing formation, two pipes of equal length communicating with a common header were packed with a finely divided mineral material. One pipe had an inside diameter of 1.4 centimeters and the second an inside diameter of 2.64 centimeters. Both pipes were 30.5 centimeters in length. The smaller pipe was packed with fine sand and the larger pipe packed with a uniform mixture of 90% fine sand and 10% finely divided fire clay.

This arrangement approximated the permeability heterogeneity of naturally occurring oil bearing formations. As will be apparent from the previous discussion, the relative mobilities of a flooding medium and residual oil in zones of different permeabilities of a heterogeneous formation will have considerable bearing upon the ultimate efficiency of oil recovery.

The tubes thus constituted were first flooded through the common header chamber with a salt brine containing 3% sodium chloride. Unless otherwise stated herein, the percentage figures refer to weight percent based on the total weight of the composition. Thereafter the pipes were flooded with a crude oil having a viscosity of 34 centipoises. Preliminary measurements of oil flow through the tubes indicated a relative permeability ratio for oil between the two media of about 5 to 1 for the sand and sand-clay mixtures, respectively. This oil permeability ratio is equal to $V_1A_2/V_2A_1$ wherein $V_1$ and $V_2$ are the volumes of oil collected over equal time periods, from the large and small pipes, respectively; $A_1$ and $A_2$ are the cross-sectional areas of the large and small pipes, respectively.

Subsequently, the oil was displaced from the tubes by flooding them with a brine, containing 3% NaCl, to demonstrate a conventional water-flooding operation.

The tubes were reflooded with the crude oil which was displaced by a solution of glycerine in a 3% NaCl brine having a viscosity of 1.47 centipoises. Upon completion of this operation the glycerine solution was displaced by the 3% salt brine and the tubes once again flooded with the oil. This oil was displaced for a third time with a 0.05% by weight solution of a high molecular weight, flocculant grade polyethylene oxide in 3% sodium chloride brine.

The relative effectiveness of the aforedescribed flooding operations was determined by taking several cuts of the displaced fluids over a series of time intervals during the flooding operation and observing the quantity of aqueous fluid coproduced with the oil.

The results of the foregoing operations are reported in the following table. Also reported are the results of additional experiments conducted in a manner similar to that described above. In these experiments various polymers with high "resistance properties" including a polystyrene sulfonate, a polyacrylamide and a sodium poly-2-sulfoethyl methacrylate were substituted for the polyethylene oxide. In addition, water-soluble polymers not having the specified "resistance properties" were used in place of the glycerine to provide comparative performances. These latter polymers included a certain species of each of the polyvinyl alcohols, locust bean gums, carboxymethyl celluloses and copolymers of the methyl half ester of maleic anhydride and styrene.

In the experiments with each polymer, the pipes were repacked with materials as described above except for Examples 3 and 4. In these examples mixtures of sand and diatomaceous earth were used. After each repacking of the tubes, the permeability ratio for oil flow through the two tubes was redetermined.

TABLE I

| Ex. No. | Run No. | Flooding medium [1] Additive | Wt. percent | R Value of polymer | Viscosity, centipoises | Oil [2] permeability ratio | "Cut" [3] No. | Oil produced (cumulative), milliliters [4] | Water produced (cumulative), milliliters [4] |
|---|---|---|---|---|---|---|---|---|---|
| 1 | 1 | Control [5] | | | | 5 | 1 | 11 | 0 |
| | | | | | | | 2 | 17 | 20 |
| | | | | | | | 3 | 22 | 65 |
| | | | | | | | 4 | 27 | 110 |
| | | | | | | | 5 | 30 | 160 |
| | | | | | | | 6 | 32 | 208 |
| | | | | | | | 7 | 33 | 257 |
| | 2 | Glycerine | | | 1.47 | 5 | 1 | 12.5 | 0 |
| | | | | | | | 2 | 20.5 | 18 |
| | | | | | | | 3 | 27 | 43.5 |
| | | | | | | | 4 | 30 | 75.5 |
| | | | | | | | 5 | 32 | 114.5 |
| | | | | | | | 6 | 34 | 162.5 |
| | 3 | PEO [7] | 0.05 | 6.8 | 1.46 | 5 | 1 | 13 | 0 |
| | | | | | | | 2 | 22 | 11 |
| | | | | | | | 3 | 30.5 | 26 |
| | | | | | | | 4 | 34.5 | 53 |
| | | | | | | | 5 | 36.5 | 86 |
| 2 | 1 | Control [5] | | | | 4 | 1 | 15 | 0 |
| | | | | | | | 3 | 32 | 67 |
| | | | | | | | 5 | 37 | 169 |
| | 2 | Glycerine | | | 1.47 | 4 | 1 | 12.5 | 0 |
| | | | | | | | 3 | 27 | 43.5 |
| | | | | | | | 6 | 34 | 162.5 |
| | 3 | SPSS [8] | 0.05 | 2.8 | 1.35 | 4 | 1 | 16.5 | 0 |
| | | | | | | | 3 | 36.5 | 34 |
| 3 [6] | 1 | Control [5] | | | | 3.6 | 1 | 13 | 0 |
| | | | | | | | 3 | 30 | 80 |
| | | | | | | | 5 | 42 | 172 |
| | 2 | Glycerine | | | 1.4 | 3.6 | 1 | 14 | 0 |
| | | | | | | | 3 | 39 | 54 |
| | | | | | | | 4 | 41 | 80 |
| | 3 | PAAm [9] | | >3 | 1.36 | 3.6 | 1 | 14 | 0 |
| | | | | | | | 3 | 38 | 32 |
| | | | | | | | 5 | 43.5 | 56 |
| 4 [6] | 1 | Control [5] | | | | 5.7 | 1 | 10 | 0 |
| | | | | | | | 3 | 22 | 88 |
| | | | | | | | 6 | 32 | 242 |
| | 2 | PVA [10] | 0.5 | <1 | 1.41 | 5.7 | 1 | 11 | 0 |
| | | | | | | | 3 | 24 | 89 |
| | | | | | | | 6 | 33 | 221 |
| | 3 | PAAm [9] | 0.005 | >3 | 1.31 | 5.7 | 1 | 12 | 0 |
| | | | | | | | 3 | 32 | 81 |
| | | | | | | | 4 | 37 | 126 |
| 5 | 1 | Control [5] | | | | 3.7 | 1 | 15 | 2 |
| | | | | | | | 3 | 30 | 69 |
| | | | | | | | 5 | 34 | 124 |
| | 2 | LBG [11] | 0.12 | 0.36 | 1.40 | 3.7 | 1 | 14 | 0 |
| | | | | | | | 3 | 31 | 49 |
| | | | | | | | 5 | 37 | 131 |
| | 3 | PSEM [12] | 0.05 | 2.15 | 1.34 | 3.7 | 1 | 17 | 0 |
| | | | | | | | 3 | 33 | 19 |
| | | | | | | | 4 | 37 | 29 |
| | | | | | | | 5 | 43 | 69 |
| 6 | 1 | Control [5] | | | | 6 | 1 | 12 | 0 |
| | | | | | | | 3 | 20.5 | 67.5 |
| | | | | | | | 5 | 28 | 158 |
| | 2 | CMC [13] | 0.6 | 0.07 | 1.41 | 6 | 1 | 13.5 | 13.5 |
| | | | | | | | 3 | 24 | 85.5 |
| | | | | | | | 4 | 28 | 131.5 |
| | 3 | PSEM [12] | 0.05 | 2.15 | 1.34 | 6 | 1 | 18 | 3 |
| | | | | | | | 3 | 36 | 55 |

Footnotes at end of table.

TABLE I—Continued

| Ex. No. | Run No. | Flooding medium [1] | | | | Oil [2] permeability ratio | "Cut" [3] No. | Oil produced (cumulative), milliliters [4] | Water produced (cumulative), milliliters [4] |
|---|---|---|---|---|---|---|---|---|---|
| | | Additive | Wt. percent | R Value of polymer | Viscosity, centipoises | | | | |
| 7 | 1 | Control [5] | | | | 5 | 1 | 11 | 1 |
| | | | | | | | 3 | 26 | 86 |
| | | | | | | | 4 | 33 | 179 |
| | 2 | MMS [14] | 0.83 | 0.27 | 1.75 | 5 | 1 | 13 | 0 |
| | | | | | | | 3 | 31 | 71 |
| | | | | | | | 4 | 34 | 118 |
| | 3 | PSEM [12] | 0.05 | 2.15 | 1.34 | 5 | 1 | 13 | 0 |
| | | | | | | | 3 | 32.5 | 32.5 |
| | | | | | | | 4 | 36.5 | 48.5 |

[1] The flooding medium base into which the various viscosity enhancing additives were incorporated was a 3% by weight solution of NaCl in water.
[2] The oil permeability ratio is the oil flow rate per unit area in the small tube divided by the oil flow rate per unit area in the large tube.
[3] A "cut" refers to the amounts of oil and water produced over a given time interval of production. To indicate how initial water breakthrough and production performance may vary throughout an entire flooding operation, several "cuts" are taken during each test run beginning with "Cut 1" (taken at initial water breakthrough unless otherwise indicated). To condense the data, some of the intermediate cuts are not reported.
[4] The volumes of water and oil reported are the cumulative production of these materials through the indicated number of cuts.
[5] This is the base flooding medium without further additions.
[6] In Examples 3 and 4 the sand and sand-clay mixture packings in the large and small pipes were replaced with mixtures of 10.3% diatomaceous earth and 89.7% sand and 2.8% diatomaceous earth and 97.2% sand, respectively.
[7] PEO is a water-soluble, high molecular weight, flocculant grade polyethylene oxide.
[8] SPSS is a water-soluble sodium polystyrene sulfonate having a weight average molecular weight of about 5 million.
[9] PAAm is a water-soluble polyacrylamide having about 4% of its carboxamide groups hydrolyzed to carboxylic groups and a weight averaged molecular weight of about 3 million.
[10] PVA is a commercial polyvinyl alcohol characterized as a high molecular weight polymer by its manufacturer.
[11] LBG is a locust bean gum ("Hallmark" brand, Stein Hall & Co.).
[12] PSEM is a water-soluble polymer of sodium sulfoethylmethacrylate having a weight average molecular weight of about 2.9 million.
[13] CMC is a carboxymethyl cellulose ether (grade 10D, manufactured by E. I. duPont).
[14] MMS is the sodium salt of a methyl half ester of a copolymer of styrene and maleic anhydride prepared in accordance with Example 1 of U.S. Pat. 3,025,237.

Example 8

To illustrate the importance of conducting the flooding operations in the effective absence of free oxygen, several experiments were carried out to ascertain the viscosity, i.e., molecular weight, stability of polymer solutions in the presence of ferrous ions. Trace amounts of ferrous ions are encountered in most, if not all, oil bearing formations. While the existence and magnitude of the resistance property of a particular water-soluble polymer cannot be predicted from consideration of its molecular weight alone, it has been observed that with polymers possessing resistance properties above the specified minimum of 1.5, molecular weight degradation thereof decreases the numerical value of this polymer property.

In the following experiments a partially hydrolyzed polyacrylamide having a resistance property greater than 3 was subjected, in the form of an aqueous solution thereof, to conditions conducive to rapid molecular weight degradation. To aliquots of a surface water solution containing 0.05% by weight of the polymer were added 10 parts per million of ferrous sulfate and 100 parts per million of N-hydroxyethylethylenediaminetriacetic acid. In one aliquot no attempt was made to remove oxygen normally dissolved in the water at room temperature. In a second aliquot the oxygen content was reduced to a satisfactory low level by bubbling nitrogen through the water. The viscosities of both the oxygenated and deoxygenated polymer solutions were measured under comparable conditions prior to the addition of the ferrous ions and the ferric chelating agent and again 5 minutes after such additions. The chelating agent was used to introduce rapid degradation of the polymer thereby simulating the effects which would ordinarily occur over an extended period of several months during a field operation. For each aliquot, the initial viscosity of the polymer solution was 1.52 centipoises. After 5 minutes the oxygen containing solution had dropped to 0.97 centipoise while the solution deoxygenated with nitrogen had only dropped to 1.35 centipoises.

The same or better results are achieved by employing for the flooding medium base connate water from the oil bearing formation or surface waters which have been treated with an oxygen reducing chemical agent.

By removing oxygen from, or keeping it out, the water used as the flooding medium base, polymers having resistance properties greater than 1.5 dissolved in such water are stabilized against molecular weight breakdown and loss of resistance properties when such polymer solutions are utilized in secondary recovery operations.

What is claimed is:

1. In a process for recovering crude oil from a compact subterranean oil bearing formation which comprises injecting into said formation through an input well communicating with said formation an aqueous flooding medium having dissolved therein a polymeric agent whereby oil is displaced in the formation toward at least one output well communicating with the same formation, the improvement which consists in the combination of using for the polymeric agent, a water-soluble, substantially linear organic polymer characterized by a resistance property of at least about 1.5; the amount of the polymer used being within the range from about 0.001 to about 0.2% by weight of the flooding medium, and using an aqueous flooding medium substantially free of molecular oxygen.

2. A method as in claim 1 wherein the crude oil has a viscosity within the range of 0.1 to 6 centipoises.

3. A method as in claim 2 wherein opportunity for cross flow within said formation exists.

4. A method as in claim 2 wherein opportunity for cross flow within said formation exists and there is a vertical variability in permeability distribution of at least 10 fold.

References Cited

UNITED STATES PATENTS

| 2,731,414 | 1/1956 | Binder et al. | 166—9 |
| 3,018,826 | 1/1962 | Sandiford | 166—9 |
| 3,020,952 | 2/1962 | Zerweck et al. | 166—9 X |
| 3,039,529 | 6/1962 | McKennon | 166—9 |
| 3,067,161 | 12/1962 | Roth | 166—9 |
| 3,079,337 | 2/1963 | Turbak et al. | 166—9 X |
| 3,087,539 | 4/1963 | Maurer | 166—9 |
| 3,180,410 | 4/1965 | Turbak | 166—9 |
| 3,208,518 | 9/1965 | Patton | 166—9 |
| 3,282,337 | 11/1966 | Pye | 166—9 |
| 3,305,016 | 2/1967 | Lindblom et al. | 166—9 |

STEPHEN J. NOVOSAD, *Primary Examiner.*